United States Patent [19]
Wakimoto

[11] Patent Number: 5,691,719
[45] Date of Patent: Nov. 25, 1997

[54] ANALOG/DIGITAL CONVERTER CAPABLE OF DEFINING AND STORING A/D CONVERTED DATA

[75] Inventor: Akihiko Wakimoto, Itami, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 516,076

[22] Filed: Aug. 17, 1995

[30] Foreign Application Priority Data

Aug. 29, 1994 [JP] Japan .................................. 6-203526

[51] Int. Cl.⁶ .................................................. H03M 1/00
[52] U.S. Cl. .......................... 341/141; 341/155; 341/132
[58] Field of Search ................................ 341/155, 141, 341/132

[56] References Cited

U.S. PATENT DOCUMENTS 4,586,022  4/1986  Acuff .................................... 341/155
5,210,538  5/1993  Kuroiwa .............................. 341/132
5,231,397  7/1993  Ridkosil ............................... 341/155
5,291,197  3/1994  Abe ..................................... 341/141

FOREIGN PATENT DOCUMENTS 2 243 734  11/1991  United Kingdom .

*Primary Examiner*—Howard L. Williams
*Attorney, Agent, or Firm*—Lowe, Price, LeBlanc & Becker

[57] ABSTRACT

An A/D converter wherein data obtained by A/D converting an analog signal in an A/D converting unit is stored in a first register, the data in the first register and the data in a second register are compared to each other by a comparator, and when the data in the first register is larger (or smaller) than that in the second register, a first switching means is closed so that the data in the first register is stored in the second register. In the second register, a maximum value (or a minimum value) of the A/D-converted data hitherto obtained is stored.

24 Claims, 14 Drawing Sheets

ANALOG/DIGITAL CONVERTER CAPABLE OF DEFINING AND STORING A/D CONVERTED DATA

BACKGROUND OF THE INVENTION

1. Field of the Invention

The present invention relates to an analog/digital converter (hereinafter referred to as "A/D-converter") for converting analog signal into digital signal.

2. Description of the Related Art

FIG. 1 is a block diagram showing an essential part of a conventional A/D converter. An analog signal inputted to an analog input terminal 1 is inputted to an A/D converting unit 2 where the analog signal is converted into a digital signal. The A/D-converted digital signal is consecutively delivered to and stored in a conversion result register 3 every time the A/D conversion is completed. The data stored in the conversion result register 3 are read out by a control unit such as a CPU. The read-out data is used for controlling a predetermined apparatus.

As aforementioned, in the conventional A/D converter, since the A/D-converted data are successively stored in the conversion result register 3, the conversion register 3 only stores the A/D conversion result of the analog signal, which is undefined. When the apparatus is controlled on the basis of the data stored in the conversion result register 3, the CPU must read out the data from the conversion result register 3 each time and discriminate the variation of the data, resulting in increasing the load of the CPU.

SUMMARY OF THE INVENTION

The present invention has been devised to solve the problems pointed out above, and the main object thereof is to provide an A/D converter which can define and store an A/D-converted data.

In an A/D converter according to the present invention, the data obtained by A/D-converting an analog signal in the A/D converting unit is stored in a first register, and the data in the first register and the data in a second register are compared with each other by a comparator. When the data in the first register is greater (or less) than the data in the second register, a first switching means is closed and the data in the first register is stored in the second register. When the data in the first register is less (or greater) than the data in the second register, the switching means is opened, and the data in the first register are not stored in the second register. Thus the second register stores a maximum value (or minimum value) of a data since the execution of A/D conversion.

The comparator can be constructed so as to compare the data in the first register and a predetermined reference data.

When a second switching means is provided for selectively inputting one signal from multi-channel signals to the A/D converting unit, the A/D converter can be versatile to the multi-channels. In this case, the first register is preferably provided with memory areas corresponding to the channels, thereby preventing the data to be given to the second register from the first register from changing into the data of other channel subsequently A/D-converted. Thus the second register stores a maximum value (or minimum value) of a data in all channels since the execution of A/D conversion.

Furthermore, when the second register is provided with memory areas corresponding to the channels, the second register stores a maximum value (or minimum value) of data for each channel since the execution of A/D conversion.

Still further third register may be provided instead of providing the second register having memory areas corresponding to the channels. It is easy to identify which channel data the second register stores.

When the A/D converting unit is so constructed as to output a conversion finish signal, the conversion finish signal is to be outputted to the outside on the basis of the output of the comparator. This can dispense with an unnecessary process.

When a fifth register is provided so as to switch the comparative operation of the comparator, it is possible to select the data to be stored in the second register between a maximum value data and a minimum value data properly. Thus the versatility of data processing is enhanced. When it is so constructed that the fifth register is provided with memory areas corresponding to the channels, and that a memory area of the fifth register is selected on the basis of the data of the channel selected by the selector, the comparative operation of the comparator can be switched in accordance with the data in the memory area of the fifth register. This makes it possible to select a channel whose maximum value data or minimum value data hitherto obtained is to be examined. It is also possible to select a channel data not to be compared.

Moreover it may be constructed that a counter is provided for counting A/D conversion finish signals, and the data in the first register is stored in the second register when the preset count value is obtained. In such a configuration, a maximum value data (or minimum value data) can be stored in the second register in a predetermined period of time.

Furthermore, when a clear means is provided to clear the data in the second register, it is possible to set the time for starting the comparison to obtain the maximum value data or the minimum value data.

The above and further objects and features of the invention will more fully be apparent from the following detailed description with the accompanying drawings.

DETAILED DESCRIPTION OF THE PREFERRED EMBODIMENTS

The present invention will now be described referring to the accompanying drawings.

Embodiment 1

Figure 1:
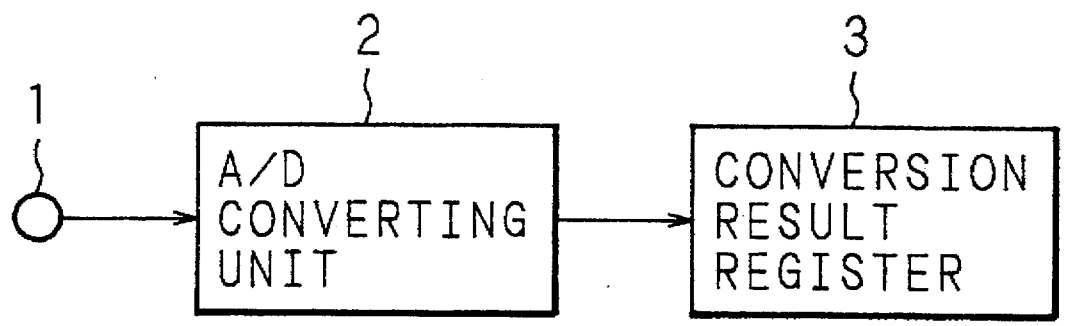
FIG. 1 is a block diagram showing a configuration of a conventional A/D converter.
Figure 2:
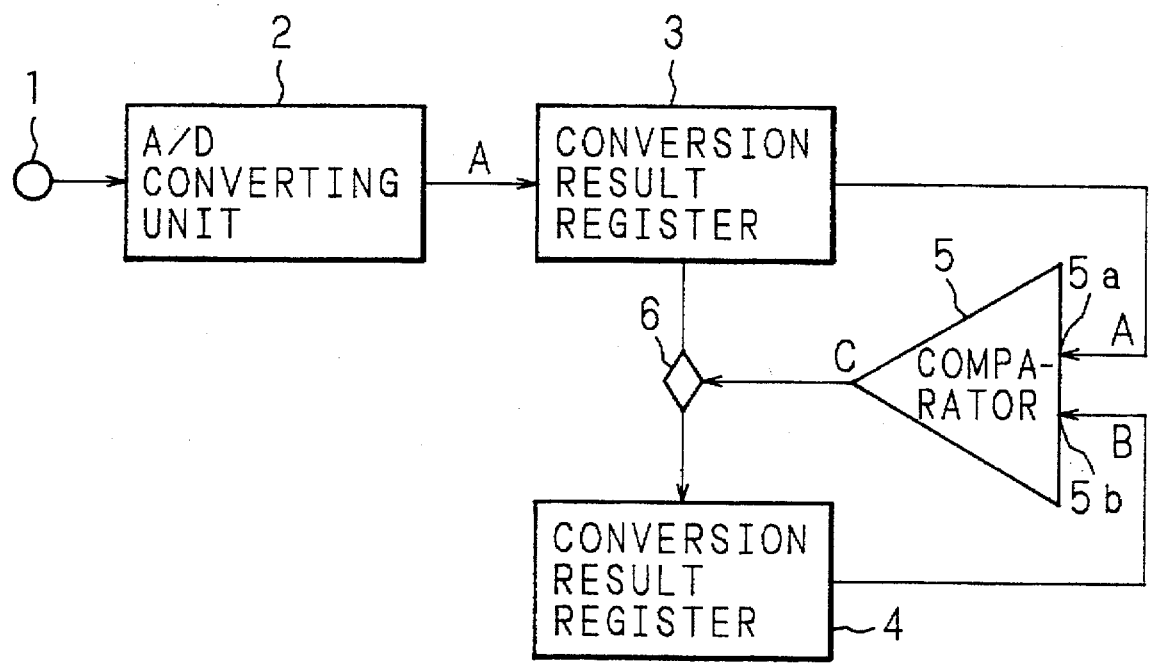
FIG. 2 is a block diagram showing a configuration of a first embodiment of an A/D converter of the present invention.

FIG. 2 is a block diagram showing a configuration of the first embodiment of the A/D converter of the present invention.

An analog signal inputted to an analog input terminal 1 is inputted to an A/D converting unit 2. Data A which is the A/D conversion result outputted from the A/D converting unit 2 is inputted to and stored in a conversion result register 3 being a first register. The data A stored in the conversion result register 3 is inputted to a conversion result register 4 being a second register through a switching circuit 6, and also to an input terminal 5a of a comparator 5 directly. Data B stored in the conversion result register 4 is inputted to the other input terminal 5b of the comparator 5. The output C of the comparator 5 is given to the switching circuit 6 as a switching signal. The data A and B are compared with each other by the comparator 5. When the data A is greater than the data B, the output C of the comparator 5 is "1", thereby closing the switching circuit 6. When the data A is equal to or less than the data B, the output C is "0", thereby opening the switching circuit 6.

Next, explanation will be given on the operation of the A/D converter so constructed as above-mentioned. When an analog signal is inputted to the analog input terminal 1, the analog signal is A/D-converted by the A/D converting unit 2 and the resultant data A is inputted to the conversion result register 3. The data A from the conversion result register 3 is inputted to one input terminal 5a of the comparator 5, and the data B from the conversion result register 4 which stores the maximum value data till that time point is inputted to other input terminal 5b of the comparator 5. The comparator 5 compares the magnitudes of the data A and B with each other. When the data A is greater than the data B, the output C of the comparator 5 is "1", thereby closing the switching circuit 6. Thus the data in the conversion result register 3 is inputted to and stored in the conversion result register 4.

When the comparison finds that the data A is equal to or less than the data B, the output C of the comparator 5 is "0", thereby opening the switching circuit 6. As a result, the data in the conversion result register 3 is neither inputted to nor stored in the conversion result register 4. The conversion result register 4 stores data having the maximum value among the data which have been A/D-converted in a predetermined predetermined period of time. When the data A is greater than the data B, the data in the conversion result register 4 is updated. In controlling a predetermined apparatus on the basis of the A/D-converted data, it is no longer necessary to read out the data from the conversion result register by a CPU every time the A/D conversion is performed, compare it with the previous one, and ascertain the changing of the data but it has only to read out the data from the conversion result register 4 in which the data of the maximum data is stored, thereby decreasing overload on the CPU. As a result, the apparatus can be controlled in a short time. On the basis of the data of the conversion result register 4.

In the case where a minimum value data needs to be stored the comparator 5 is set as follows: when the data A is less than the data B, the output C of the comparator 5 is "1", and when the data A is equal to or greater than the data B, the output C thereof is "0". In this way, the apparatus can be controlled in short time in the same way as the case where the conversion result register 4 stores the maximum value data.

Embodiment 2

Figure 3:
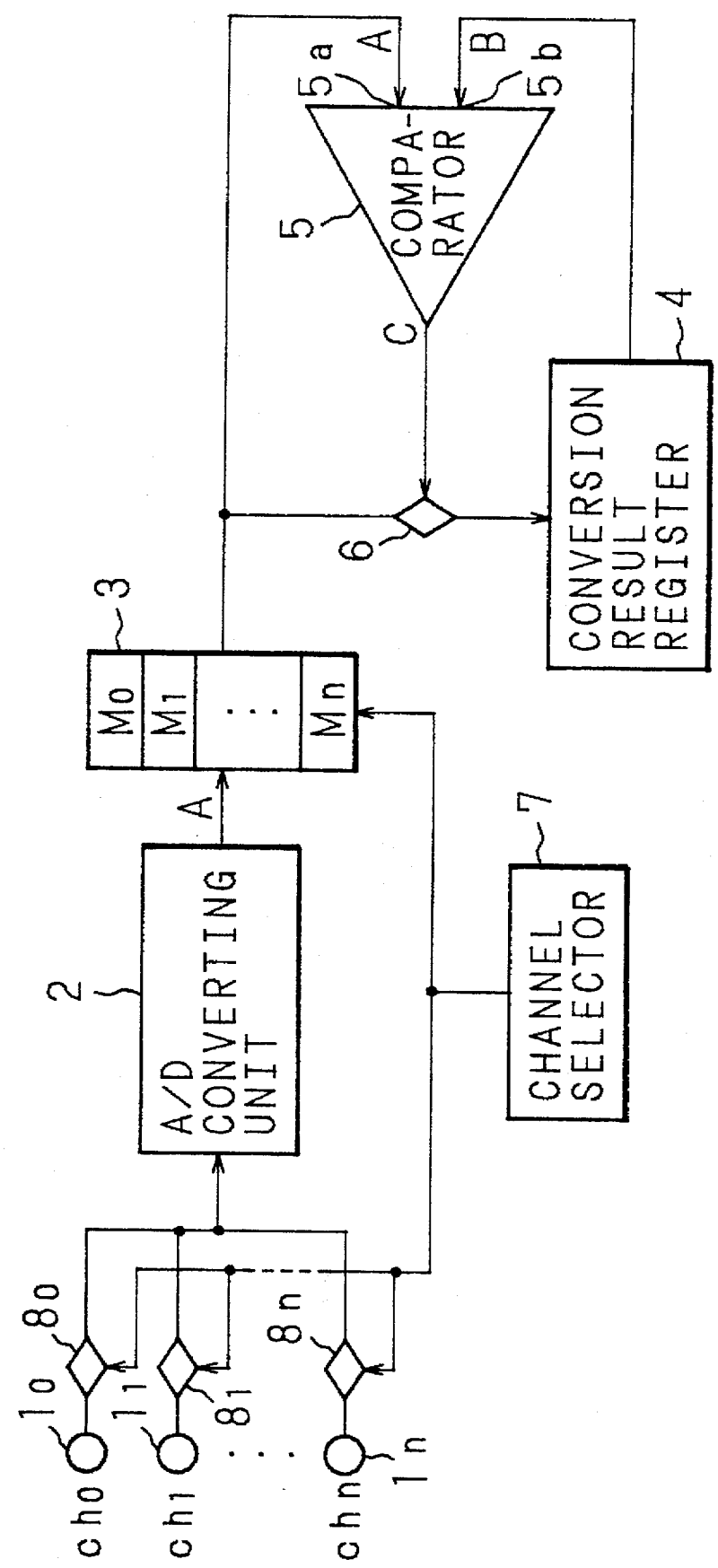
FIG. 3 is a block diagram showing a configuration of a second embodiment of an A/D converter of the present invention.

FIG. 3 is a block diagram showing a configuration of the second embodiment of the A/D converter related to the invention.

In this embodiment several channels $ch_0$, $ch_1$ ... $ch_n$ are provided, corresponding to which analog input terminals $1_0$, $1_1$ ... $1_n$ are provided. Analog signals inputted to the analog input terminals $1_0$, $1_1$ ... $1_n$ are inputted to an A/D converting unit 2 after individually passing through switching circuits $8_0$, $8_1$ ... $8_n$ being a second switching means. After the analog signals are converted into digital data in the A/D converting unit 2, the resultant data outputted from the A/D converting unit 2 is inputted to the conversion result register 3. The conversion result register 3 includes memory areas $M_0$, $M_1$ ... $M_n$ corresponding to the channels $ch_0$, $ch_1$ ... $ch_n$, that is, the analog input terminals $1_0$, $1_1$ ... $1_n$. A channel selector 7 outputs a channel selecting signal to input to the switching circuits $8_0$, $8_1$ ... $8_n$ and the conversion result register 3. The other structure is same as that shown in FIG. 2, the same numerals are attached to the same components.

Next, explanation will be given on the operation of the A/D converter.

When the channel selector 7 outputs, for example, a channel selecting signal which selects the channel $ch_1$, only the switching circuit $8_1$ is selected and closed, and the memory area $M_1$ of the conversion result register 3 is selected. An analog signal inputted to the analog input terminal $1_1$ is inputted to the A/D converting unit 2 and A/D-converted. The resultant data A is stored in the selected memory area $M_1$ and then is inputted from the conversion result register 3 to one input terminal 5a of the comparator 5. To the other input terminals 5b of the comparator 5, the data B of the conversion result register 4 which has the maximum value hitherto received. The comparator 5 compares the data A with the data B. When the data A is greater than the data B, the output C of the comparator 5 is "1", thereby closing the switching circuit 6. In this way, the data in the memory area $M_1$ is inputted to the conversion result register 4 and stored therein. When the comparison finds that the data A is equal to or less than the data B, the output C of the comparator 5 is "0", thereby opening the switching circuit 6. Thus the data in the memory area $M_1$ is not stored in the conversion result register 4. In this way, the maximum value data obtained through the A/D conversion of the analog signal of the channel $ch_1$ in a predetermined period of time is stored in the conversion result register 4. When the data A is greater than the data B, the data in the conversion result register 4 is updated.

When the channel $ch_0$, for example, is selected by a channel selecting signal of the channel selector 7 after the data in the memory area $M_1$ is stored in the conversion result register 4, the analog signal is A/D-converted in the same way as the case where the channel $ch_1$ is selected and the A/D-converted data is stored in the memory area $M_0$ of the conversion result register 3. The data A in the memory area $M_0$ and the data B in the conversion result register 4 are compared with each other. When the data A is greater than the data B, the data in the memory area $M_0$ is stored in the conversion result register 4. When another channel is selected, the same operation is performed, and so on. By changing the comparison mode, as described above the minimum value data can be also stored in the conversion result register 4. Thus the conversion result register 4 can store not only the maximum value data but also the minimum value data in the all channels $ch_0$, $ch_1$ ... $ch_n$.

When the maximum value data is to be obtained from data obtained by A/D-converting the respective analog signals of a plurality of channels, it is not necessary to read out data obtained by A/D-converting an analog signal of one channel by a CPU from one conversion result register, read out data obtained by A/D-converting an analog signal of the other channel successively from another register, and compare the two data with each other. So that the time for obtaining the maximum value data in all of the channels can be shortened. In the conventional A/D converter, when the A/D-converted data are compared channel by channel, it is likely to happen that the next A/D-converted data is possibly stored in the conversion result register where the comparison-finished data is to be stored, so that the apparatus cannot be controlled on the basis of the maximum value data or minimum value data in all the channels in a real time. According to the invention, however, since the maximum value data or minimum value data among the data of all the channels can be stored in the conversion result register 4 at any point of time, the control of the apparatus can be immediately started on the basis of the data of the conversion result register 4.

Embodiment 3

Figure 4:
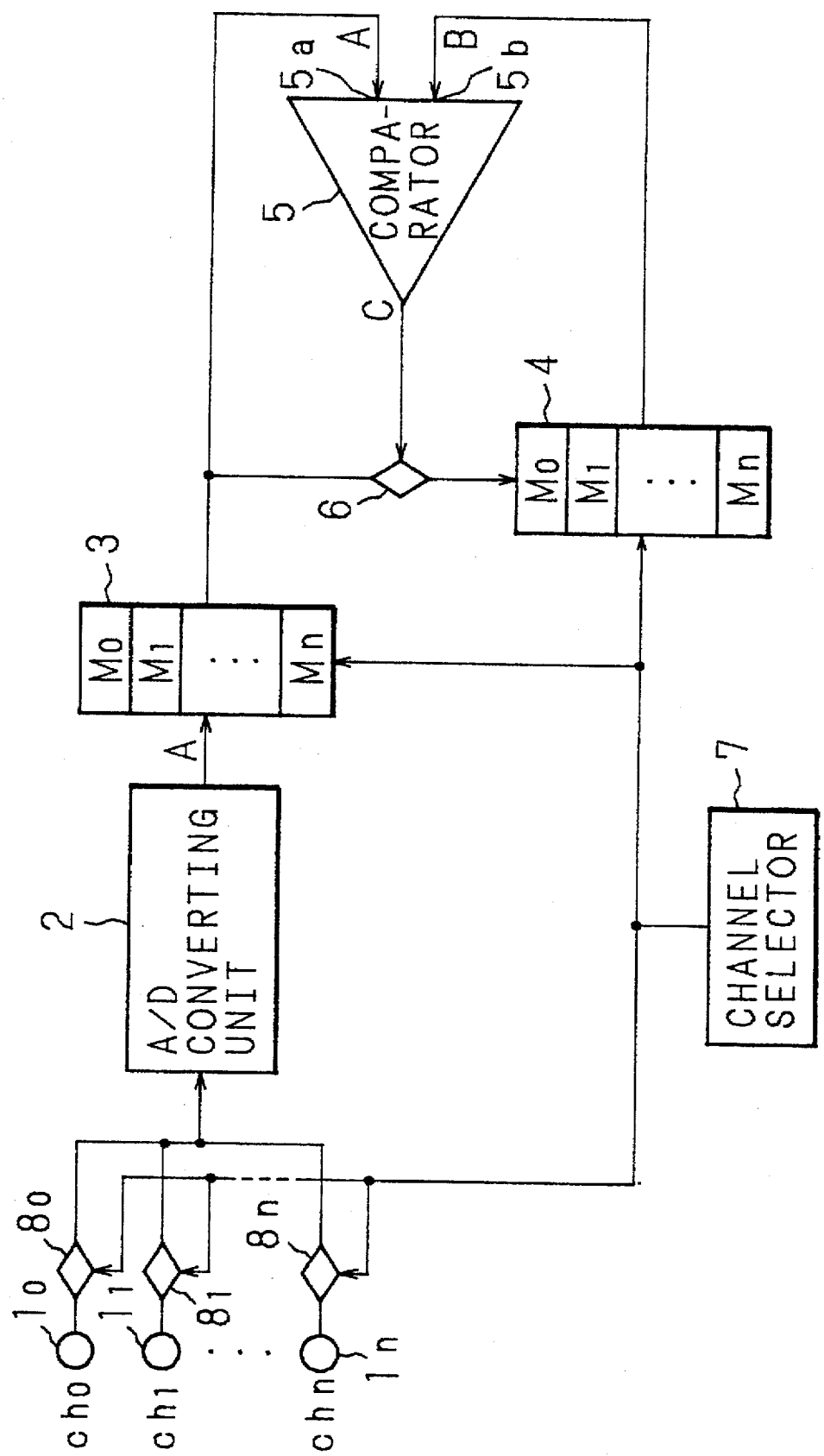
FIG. 4 is a block diagram showing a configuration of a third embodiment of an A/D converter of the present invention.

FIG. 4 is a block diagram showing a configuration of the third embodiment of the A/D converter related to the invention.

The conversion result register 4 includes memory areas $M_0$, $M_1$ ... $M_n$ corresponding to the channels $ch_0$, $ch_1$ ... $ch_n$. Channel selecting signal outputted from the channel selector 7 is given to the switching circuits $8_0$, $8_1$ ... $8_n$, and the conversion result registers 3 and 4. The configuration except the fact is same as that of the A/D converter shown in FIG. 3 and the same components have the same reference symbols.

Next, explanation will be given on the operation of the A/D converter.

When the channel selector 7 outputs, for example, a channel selecting signal which selects the channel $ch_1$, only the switching circuit $8_1$ is selected closed, and the respective memory areas $M_1$ and $M_1$ in the conversion result registers 3 and 4 are selected. The data B in the memory area $M_1$ in the conversion result register 4 is inputted to the input terminal 5b of the comparator 5. An analog signal inputted to the analog input terminal $1_1$ is A/D-converted by the A/D converting unit 2, and the A/D-converted data A is stored in the memory area $M_1$ of the conversion result register 3, and further it is inputted to the input terminal 5a of the comparator 5.

The comparator 5 compares the data A with the data B. When the data A is greater than the data B, the output C of the comparator 5 is "1", thereby closing the switching circuit 6. The data in the memory area $M_1$ of the conversion result register 3 is stored in the memory area $M_1$ of the conversion result register 4. When the comparison finds that the data A is equal to or less than the data B, the output C of the comparator 5 is 0", thereby opening the switching circuit 6. Thus the data of the memory area $M_1$ of the conversion result register 3 is not stored in the memory area $M_1$ of the conversion result register 4. That is, the maximum value data of the past in the channel $ch_1$ is stored in the memory area $M_1$ of the register 4.

The operation is conducted in the same way when another channel is selected by a channel selector 7, so that the data obtained by A/D-converting analog signals inputted to the analog input terminals $1_0$, $1_1$ ... $1_n$ are stored in the memory areas $M_0$, $M_1$ ... $M_n$ of the conversion result register 3 corresponding to the analog input terminals, that is, the channels. The memory areas $M_0$, $M_1$ ... $M_n$ of the conversion result register 4 store channel by channel a maximum value data or minimum value data among the A/D-converted data.

In this way, since the conversion result register can store the maximum value data or the minimum value data among the A/D-converted data, the several operations in the apparatus can be controlled on the basis of the data of each channel. In addition, the data processing to obtain the maxim value data of all the channels can be performed at high speed, in the same way as aforementioned. Furthermore, the operation of the apparatus can be immediately started on the basis of the data of the register storing the maximum value data or minimum value data.

Embodiment 4

Figure 5:
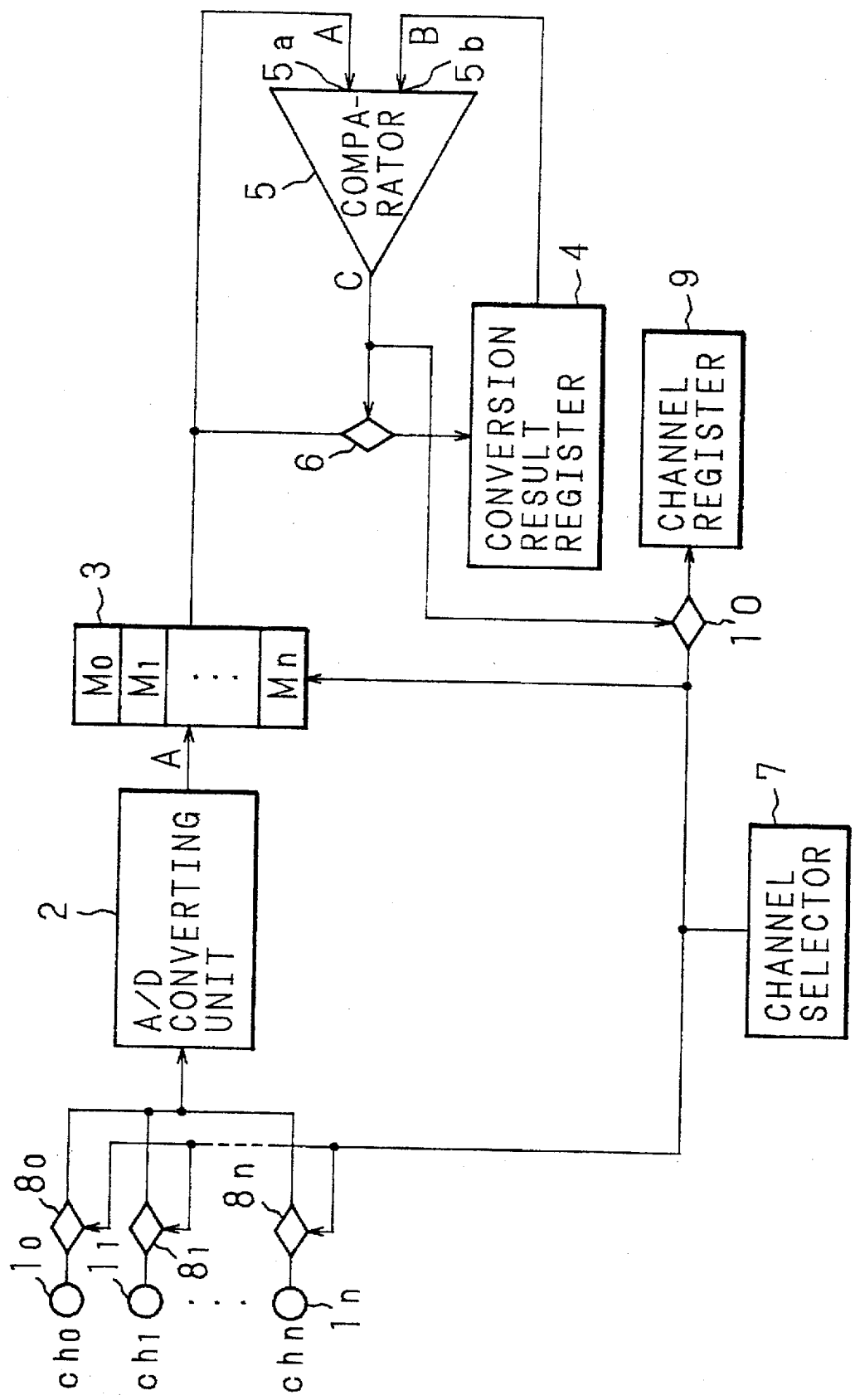
FIG. 5 is a block diagram showing a configuration of a fourth embodiment of an A/D converter of the present invention.

FIG. 5 is a block diagram showing a configuration of the fourth embodiment of the A/D converter related to the invention.

A channel selecting signal outputted from the channel selector 7 is inputted to a channel register 9 through switching circuit 10 which is a third switching means. The output C of the comparator 5 is given to the switching circuit 6 which is the first switching means and to the switching circuit 10 which is the third switching means. The other configuration is same as that of the A/D converter shown in FIG. 3, and the same components have the same reference symbols.

Next, explanation will be given on the operation of the A/D converter.

When the channel selector 7 outputs a channel selecting signal which selects the channel $ch_1$, only the switching circuit $8_1$ is selected and closed As a result, the memory area $M_1$ of the conversion result register 3 is selected. An analog signal inputted to the analog input terminal $1_1$ is inputted to the A/D converting unit 2 so as to be A/D-converted. The resultant data A is stored in the selected memory area $M_1$, and is inputted to the input terminal 5a of the comparator 5. The input terminal 5b of the comparator 5 receives data B from the conversion result register 4 having the maximum value data hitherto obtained. The comparator 5 compares data A and B with each other. When the data A is greater than the data B, the output C of the comparator 5 is "1", thereby closing both of the switching circuits 6 and 10. As a result, the data in the memory area $M_1$ in the conversion result register 3 is stored in the conversion result register 4. The data of a channel selected by the channel selecting signal is stored in the channel register 9.

When the comparison finds that the data A is equal to or less than the data B, the output C of the comparator 5 is "0", thereby opening both of the switching circuits 6 and 10. Thus the data in the memory area $M_1$ is not stored in the conversion result register 4. The data of the channel by the channel selecting signal from the channel selector 7 is not stored in the channel register 9. When the maximum value data in the conversion result register 4 is updated, the channel data corresponding to the updated data is stored in the channel register 9. When any channel other than the channel $ch_1$ is selected by the channel selecting signal outputted from the channel selector 7, the signal is compared by the comparator 5 in the same way as aforementioned, and on the basis of the comparison result, maximum value data is stored in the conversion result register 4. The data of the channel corresponding to the stored data is stored in the channel register 9.

In this way, it is easy to recognize that which has a maximum value or a minimum value, of the data obtained by A/D-converting analog signals inputted to the analog input terminals $1_0, 1_1 \ldots 1_n$. As regards the conventional A/D converter, it is necessary to read out data of the conversion result register 3 for each channel, compare them with each other so as to determine the maximum value data. Consequently this requires a repetitive arithmetic operation for comparison and a relatively long period of process time for calculating the maximum value data. In addition, sometimes new data A/D-converted is stored in the conversion result register 3 during the arithmetic operation, so that it is difficult to perform data processing for determining the maximum value data in real time. In contrast, according to the present invention, it has only to read out the data of the conversion result register 4 and the channel data of the channel register 9, so that the maximum value data or the minimum value data at that time point, and the channels thereof can be immediately recognized. Thus, the control of the operation of the apparatus can be started in a short time.

Embodiment 5

Figure 6:
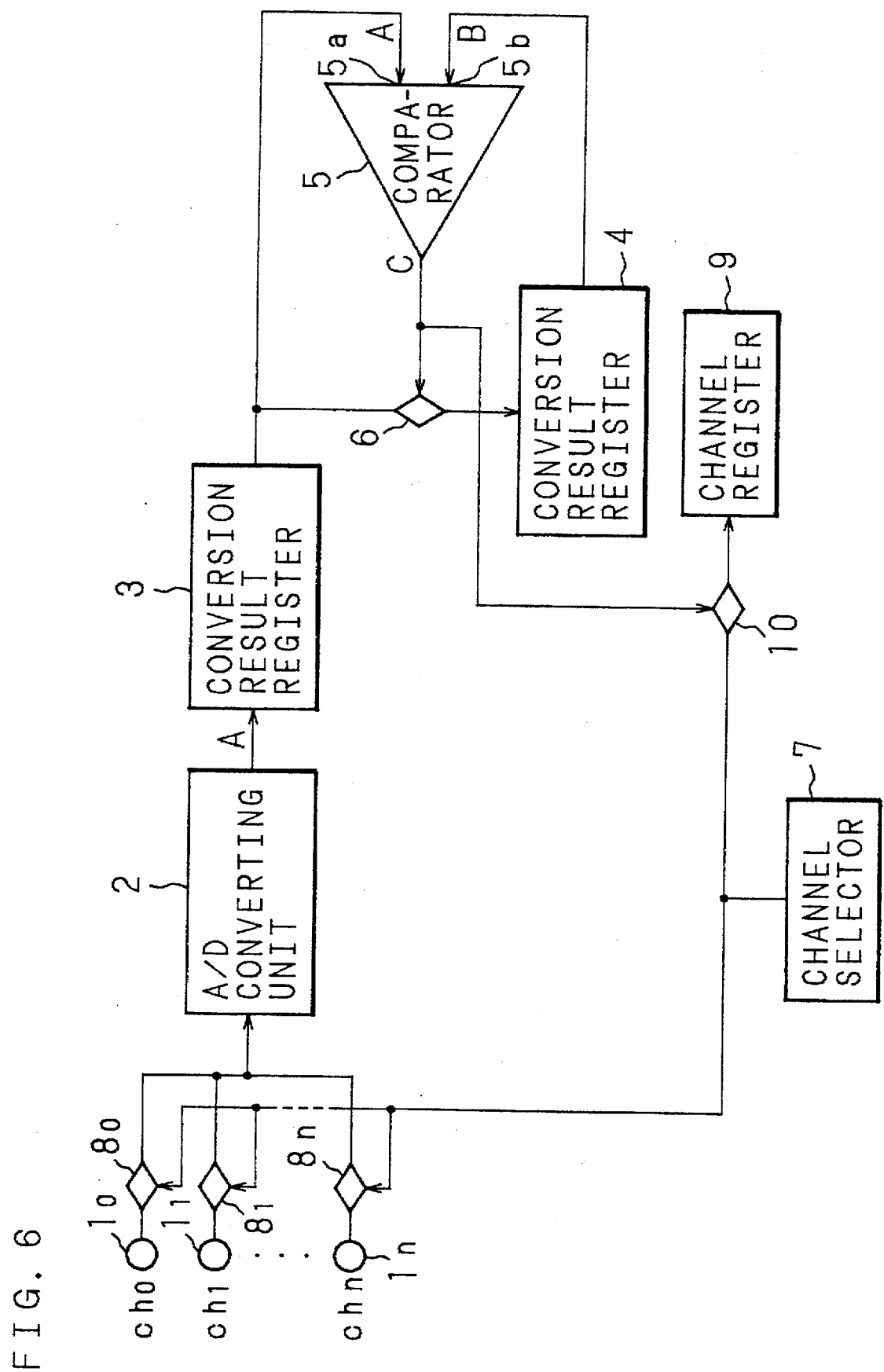
FIG. 6 is a block diagram showing a configuration of a fifth embodiment of an A/D converter of the present invention.

FIG. 6 is a block diagram showing a configuration of the fifth embodiment of the A/D converter related to the invention.

The A/D-converted data A outputted from the A/D converting unit 2 is stored in the conversion result register 3 which can store a single data. The other configuration is same as that of the A/D converter shown in FIG. 5, and the same components have the same reference symbols.

Next, explanation will be given on the operation of the A/D converter.

When the channel selector 7 outputs a channel selecting signal which selects the channel $ch_1$, the switching circuit $8_1$ is selected and closed. As a result, the analog signal inputted to the analog input terminal $1_1$ is inputted to the A/D converting unit 2 so as to be A/D-converted. The resultant data A is stored in the conversion result register 3, and is inputted to the input terminal 5a of the comparator 5. The other input terminal 5b of the comparator 5 receives data B from the conversion result register 4 having the maximum value data hitherto obtained. The comparator 5 compares data A and B with each other. When the comparison finds that the data A is greater than the data B, the output C of the comparator 5 is "1", thereby closing both of the switching circuits 6 and 10. As a result, the data of the conversion result register 3 is stored in the conversion result register 4. The data of a channel selected by the channel selecting signal is stored in the channel register 9.

When the comparison finds that the data A is equal to or less than the data B, the output C of the comparator 5 is "0", thereby opening both of the switching circuits 6 and 10. Thus the data of the conversion result register 3 is not stored in the conversion result register 4. The data of the channel is not stored in the channel register 9. Also when a channel other than the channel $ch_1$ is selected by the channel selecting signal outputted from the channel selector 7, in the same way as aforementioned, the comparator 5 compares data A and B. According to the comparison result, the maximum value data is stored in the conversion result register 4 and the channel data corresponding to the stored data is stored in the channel register 9.

In this way, it is easy to recognize which has a maximum value or a minimum value, of the data obtained by A/D-converting analog signals inputted to the analog input terminals $1_0, 1_1 \ldots 1_n$. As regards the conventional A/D converter, it is necessary to read out data of the conversion result register 3 for each channel, compare them with each other, so as to determine the maximum value data. Thus, it is necessary to perform data processing which repeats such an arithmetic operation for comparison, and a long time of data processing is required for determining a maximum value data. In addition, sometimes new data A/D-converted is stored in the conversion result register 3 during the arithmetic operation, so that it is difficult to perform data processing for determining a maximum value data in real time. In contrast, according to the present invention, it has only to read out the data of the conversion result register 4 and the channel data of the channel register 9, so that the maximum value data at the point of time, and it can be immediately recognized and that which channel analog signal the data is based upon. Thus, the control of the apparatus can be started in a short time.

The conversion result register 3 is commonly used by all the channels $ch_0, ch_1 \ldots ch_n$, so that it is possible to minimize the number of the conversion result registers, thereby simplifying the circuit and minimizing the size of the A/D converter.

Embodiment 6

Figure 7:
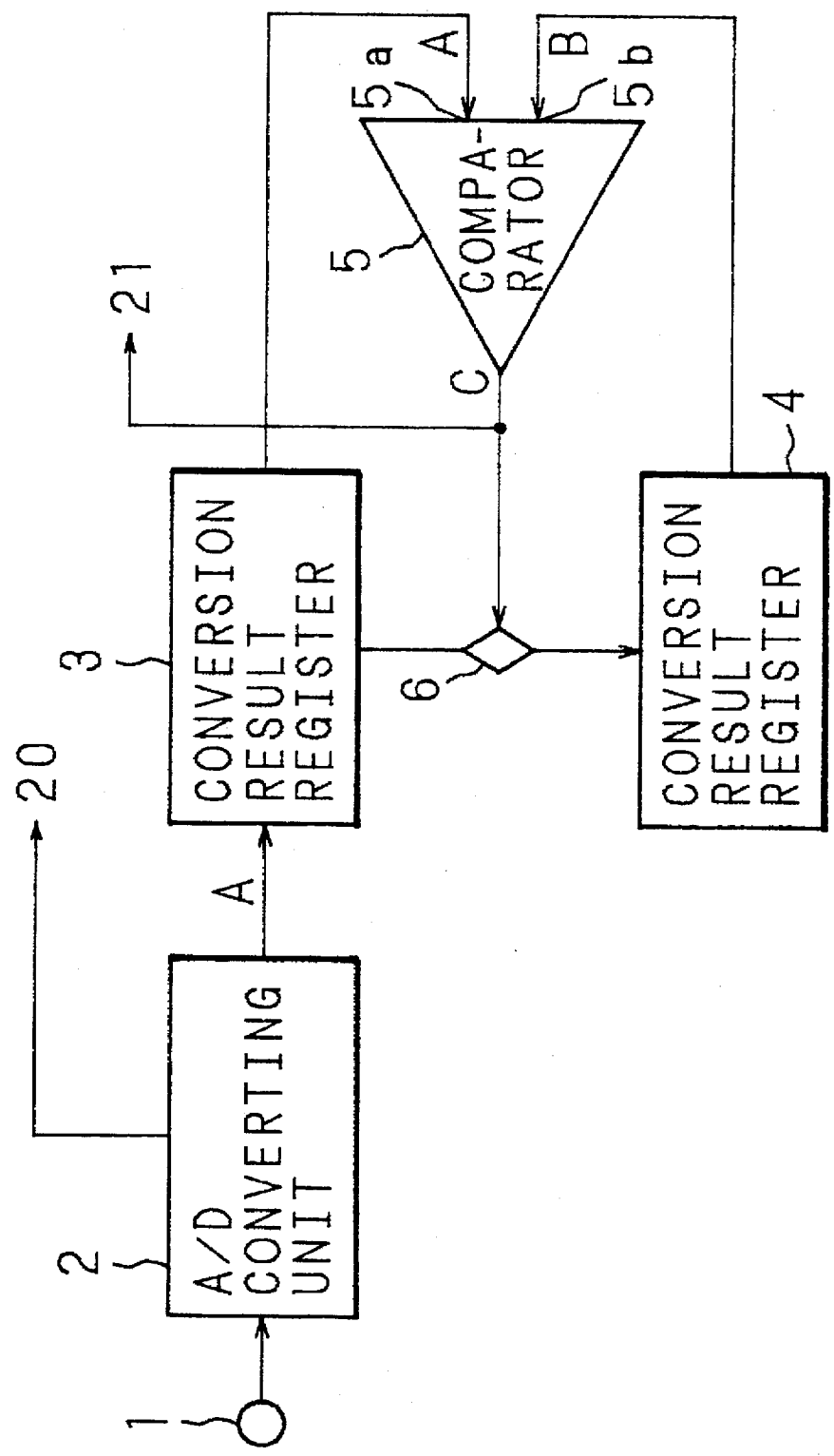
FIG. 7 is a block diagram showing a configuration of a sixth embodiment of an A/D converter of the present invention.

FIG. 7 is a block diagram showing a configuration of the sixth embodiment of the A/D converter related to the invention. An analog signal inputted to the analog input terminal 1 is inputted to the A/D converting unit 2. When the A/D conversion is finished, a conversion finish signal 20 is outputted from the A/D converting unit 2. The resultant data A outputted from the A/D converting unit 2 is inputted to a conversion result register 3 which can store a single data. The data in the conversion result register 3 is inputted to the input terminal 5a of the comparator 5, and also to a conversion result register 4 which can store a single data, through the switching circuit 6. The data B in the conversion result register 4 is inputted to the input terminal 5b, and the outputs C of the comparator 5 is given as a switching signal to the switching circuit 6 and outputted as an interrupt signal 21 to the outside.

Next, explanation will be given on the operation of the A/D converter.

When an analog signal is inputted to the analog input terminal 1, the A/D converting unit 2 A/D-converts the analog signal and the A/D-converted data A is stored in the conversion result register 3 is inputted to the input terminal 5a of the comparator 5 from the register 3. When the A/D conversion is finished, the A/D converting unit 2 outputs a conversion finish signal 20. The input terminal 5b of the comparator 5 receives data B of the conversion result register 4 having a maximum value data hitherto.

The comparator 5 compares the data A and the data B with each other, and when the comparison finds that the data A is greater than the data B, the output C of the comparator 5 is "1", and an interrupt signal 21 is outputted, thereby closing the switching circuit 6, resulting in that the data in the conversion result register 3 is stored in the conversion result register 4, that is, the data in the conversion result register 4 is updated. When the comparison finds that the data A is equal to or less than the data B, the output C of the comparator 5 is "0", thereby opening the switching circuit 6. As a result, the data in the conversion result register 3 is not stored in the conversion result register 4.

By the way, when data processing for obtaining a maximum value data from the A/D-converted data is performed, there is possibly a case where data processing is performed by reading the A/D-converted data, by using the conversion finish signal 20 showing the finish of the A/D conversion.

In the conventional A/D converter, the conversion finish signal is generated independently of the A/D-converted data every time the A/D conversion is finished, and in response to each conversion finish signal, the A/D-converted data is read out and arithmetically processed. Then, on the basis of the arithmetically processed result, the data processing is performed for obtaining a maximum value data. This requires that the A/D-converted data be examined until the A/D-converted data reaches a predetermined value even when there is no necessity of data processing, because the content of the A/D-converted data can not be discriminated.

The A/D converter according to the Embodiment 6 is made to obtain a conversion finish signal 20 which is generated every time the A/D conversion is finished, and an interrupt signal 21 being the output C of the comparator 5 which has compared the data in the conversion result register 4 storing hitherto a maximum value data and newest data A/D-converted with each other. As a result, in a case where there is a necessity to examine the content of the A/D-converted data, the data processing for obtaining the maximum value data is possible, as before, in an interrupt processing, for example, by using the conversion finish signal 20.

It can be also recognized, by using the interrupt signal 21, that a newly A/D-converted data is larger than the data hitherto A/D-converted, for example. This eliminates the necessity of repeating the data processing for obtaining a maximum value data each time the A/D conversion is finished. Since the control of the operation of the apparatus can be started when the A/D-converted data has a predetermined size, there is no necessity of continuing the data processing for obtaining the maximum data by examining the A/D-converted data. When the interrupt signal 21 is generated, the control of the apparatus can be immediately started on the basis of the stored maximum value data. As referred to above, the conversion result register 4 can also store a minimum value data. The conversion finish signal 20 and the interrupt signal 21 outputted from the comparator 5 can be selectively used.

Embodiment 7

Figure 8:
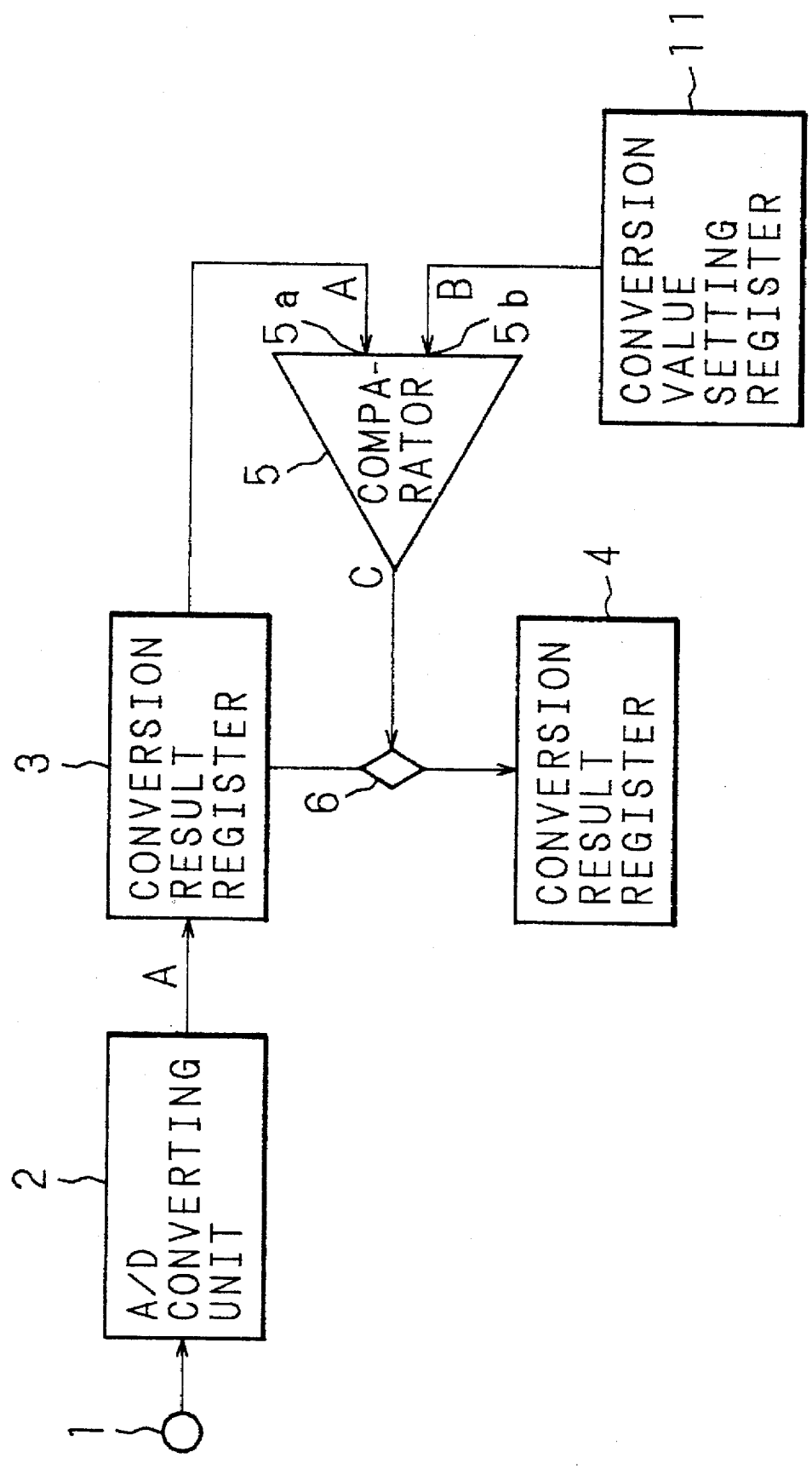
FIG. 8 is a block diagram showing a configuration of a seventh embodiment of an A/D converter of the present invention.

FIG. 8 is a block diagram showing a configuration of the seventh embodiment of the A/D converter related to the invention.

In this embodiment, a conversion value setting register 11 is provided (hereinafter "setting register"), and the data in the setting register 11 is inputted to the input terminal 5b of the comparator 5. A predetermined value is set in advance in the setting register 11 for the purpose of controlling the operation of the apparatus when an analog signal is equal to or more than a predetermined value. The other configuration is same as that of the A/D converter shown in FIG. 7, and the same components have the same reference symbols.

Next, explanation will be given on the operation of this A/D converter.

An analog signal inputted to the analog signal input terminal 1 is A/D-converted by the A/D converting unit 2, and the A/D-converted data is stored as data A in the conversion result register 3. The data A is further inputted to the input terminal 5a of the comparator 5. The comparator 5 compares the data A with data B previously set in the register 11. When the comparison finds that the data A is greater than the data B, the output C of the comparator 5 is "1", thereby closing the switching circuit 6. As a result, the data in the conversion result register 3 is stored into the conversion result register 4. When the comparison finds that the data A is equal to or less than the data B, the output C of the comparator 5 is "0", thereby opening the switching circuit 6. Thus the data in the conversion result register 3 is not stored in the conversion result register 4.

In this way, only when the A/D-converted data A is greater than the data B stored in the setting register 11, the data in the conversion result register 3 is stored in the conversion result register 4.

In such an embodiment, the preset value and an analog signal are compared with each other to determine which is larger, and then the A/D-converted data is stored in the conversion result register 4. Therefore, it is no longer necessary to examine the A/D-converted data at each A/D conversion. The control of the operation of the apparatus can be immediately started only when a reference data for examining the data is preset and the A/D-converted data reaches the reference data.

Figure 9:
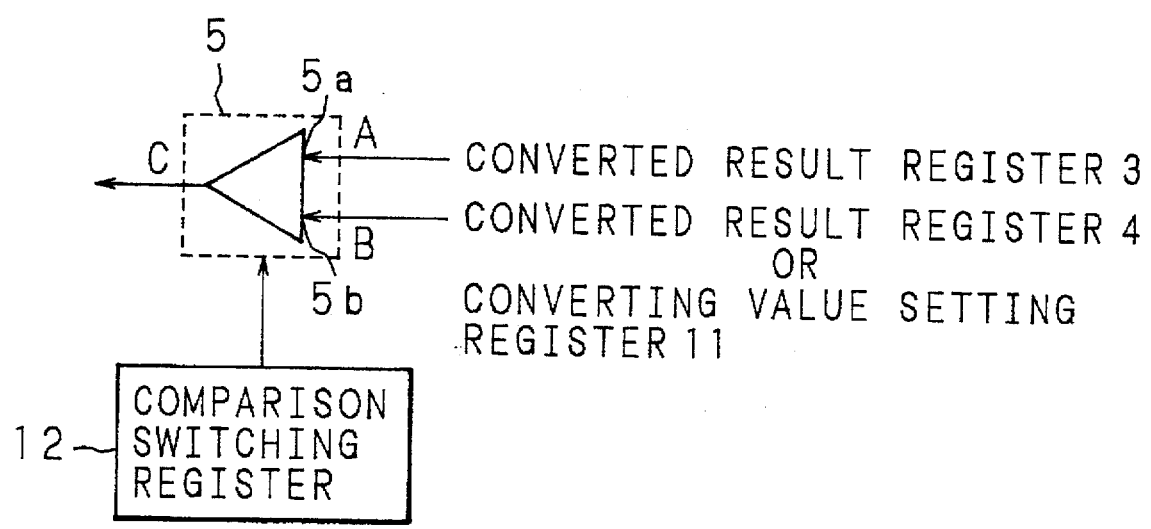
FIG. 9 is a block diagram showing a configuration of another embodiment of a comparator of the invention.

FIG. 9 is a block diagram showing a modified example of the comparator in the A/D converter of the invention.

The data A in the conversion result register 3 is inputted to the input terminal 5a of the comparator 5, and the data B in the conversion result register 4 or the setting register 11 is inputted to the input terminal 5b. The data in the comparison switching register 12 controls the switching of the comparison operation to the comparator 5 which generates an output C. The data in the comparison switching register 12 is set by a CPU or a hardware. According to the data of the comparison switching register 12, the comparator 5 is made to be capable of switching the comparison operation which compares the data A and the data B with each other. For example, in the case where the data in the comparison switching register 12 is set "0", the output C of the comparator 5 is "1" only when the data A is greater than the data B. In the case where the data in the comparison switching register 12 is set "1", the output C of the same is "1" the comparative operation is not to be performed only when the data A is equal to or less than the data B.

In this way, the conversion result register 4 which stores the data of the output C of the comparator 5, can store either a maximum value data or a minimum value data among the data hitherto A/D-converted. Accordingly, without requiring an unnecessary data processing time, the control of the operation of the apparatus can be started in a short time, the control being how the apparatus should be operated when an analog signal should take whatever value. In addition, the maximum value and minimum value of the A/D-converted data can be selectively used, so that the data stored in the conversion result register 4 can be advantageously utilized. This achieves various data processing.

Figure 10:
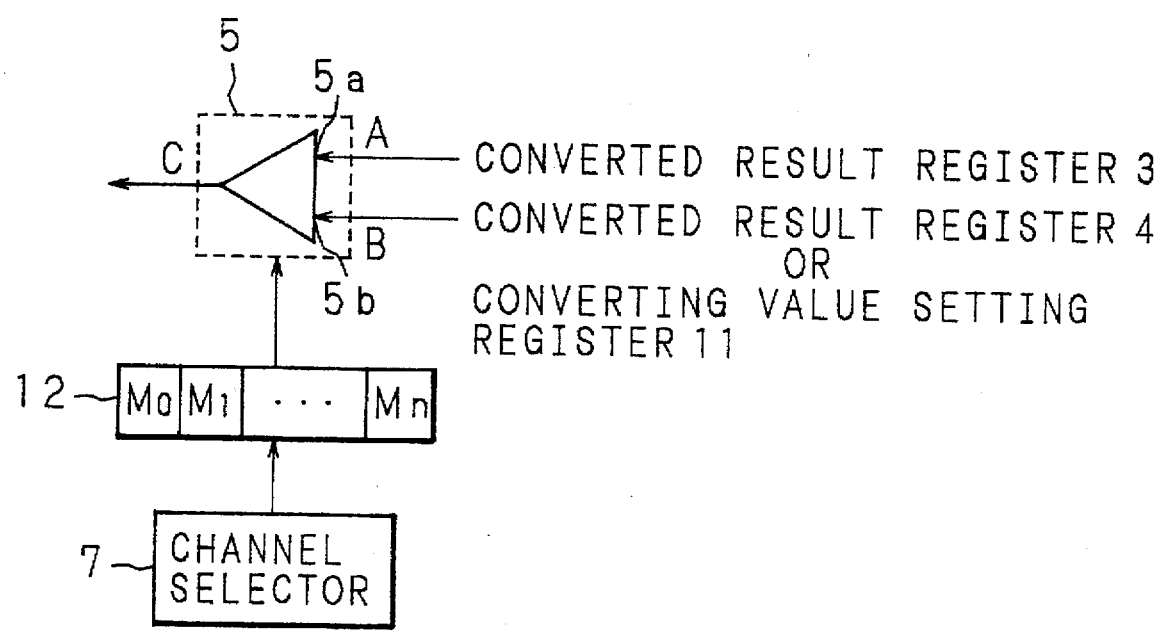
FIG. 10 is a block diagram showing a configuration of still another embodiment of a comparator of the invention.

FIG. 10 is a block diagram showing a configuration of still another modified example of the comparator of the A/D converter related to the invention.

To the input terminal 5a of the comparator 5, the data A of the conversion result register 3 is inputted, and to the input terminal 5b, the data B in the conversion result register 4 or in the setting register 11 is inputted.

The channel selecting signal outputted from the channel selector 7 is given as a selecting signal of the memory area to the comparison switching register 12 having the memory areas $M_0 \ldots M_{n-1}$, $M_n$ corresponding to channels of analog signals of multi channels. To the comparator 5, the data of the comparison switching register 12 is given. The data of the channel selector 7 is set by the CPU. According to the data of the comparison switching register 12, the comparator 5 is made to be capable of switching the operation of comparing the data A with the data B.

For example, in the case where the data in the memory area $M_0$ of the comparison switching register 12 is set "0", the output C of the comparator is "1" only when the data A is greater than the data B. In the case where the data in the memory $M_0$ is set "1", the output C is "1", or comparative operation is prevented from being performed only when the data A is equal to or less than the data B. The plurality of analog signals in the plurality of channels are selected by the channel selector 7, and the selected analog signal is A/D-converted in the A/D converting unit 2. The data of the channel selector 7 selecting a particular channel is given to the comparison switching register 12, so that it is possible that the comparator 5 compares data corresponding to the selected channel in accordance with the data stored in the comparison switching register 12.

Thereby, the maximum value or minimum value of the A/D-converted data hitherto obtained can be selectively identified for each of the analog signals of the plurality of channels. Therefore, it is possible to correspond toe the conversion result in conformity with a character of an analog signal which corresponds to a channel. Data processing of various analog signals can be executed for the result of A/D conversion of them when it is necessary, and unnecessary processing can be dispensed with.

Embodiment 8

Figure 11:
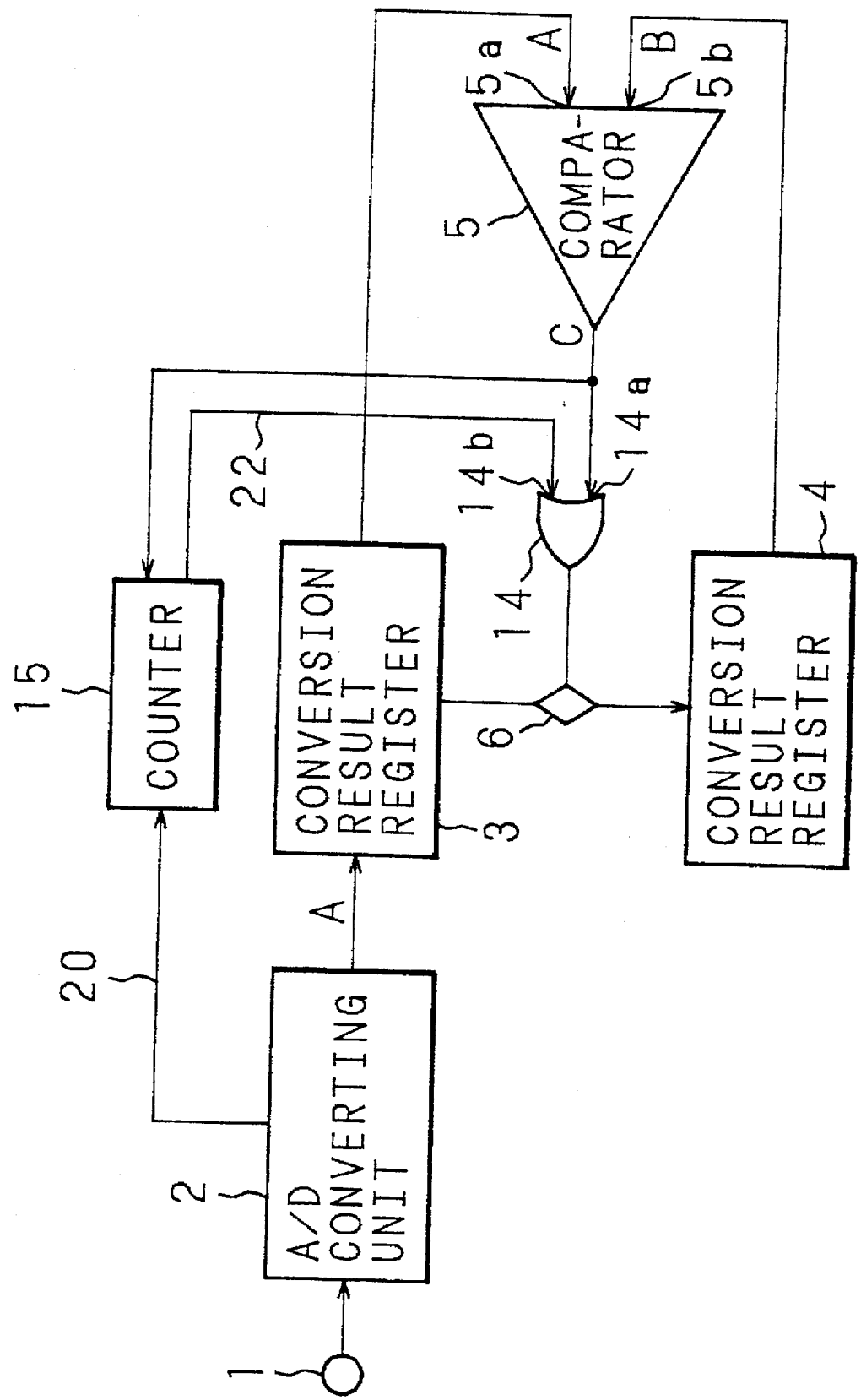
FIG. 11 is a block diagram showing a configuration of an eighth embodiment of an A/D converter of the present invention.

FIG. 11 is a block diagram showing a configuration of the eighth embodiment of the A/D converter related to the invention. The analog signal inputted to the analog signal terminal 1 is inputted to the A/D converting unit 2. The conversion finish signal 20 outputted from the A/D converting unit 2 is inputted to a counter 15 so as to be counted, and the A/D-converted data is inputted to the conversion result register 3. The data A in the conversion result register 3 is inputted to the input terminal 5a of the comparator 5, and inputted to the conversion result register 4 through the switching circuit 6. The data B in the conversion result register 4 is inputted to the input terminal 5b of the comparator 5. The output C of the comparator 5 is inputted to one input terminal 14 of an OR circuit 14, and inputted to a counter 15 as a clear signal. The counter 15 counts conversion finish signals 20, and when a predetermined value is counted, a signal 22 is inputted to the other input terminals 14b of the OR circuit 14 therefrom. The output of the OR circuit 14 is inputted to the switching circuit 6 as a switching signal.

This A/D converter is so constructed that, for example, in a case where analog signal change to increase and where the maximum value hitherto obtained is stored in the conversion result register 4, when the analog signal temporarily becomes maximum and then the value of the analog signal becomes steady state in less than this maximum value, the data A/D-converted at the steady state is stored in the conversion result register 4. In either case where analog signals consecutively change or becomes steady state, the value of the analog signal at that time can be identified.

Next, explanation will be given on the operation of the A/D converter.

An analog signal inputted to the analog input terminal 1 is A/D-converted in the A/D converting unit 2, and the A/D-converted data is stored in the conversion result register 3. The data A in the conversion result register 3 and the data B in the conversion result register 4 are inputted to the comparator 5 so as to be compared. When it is arranged such that the output C of the comparator 5 is "1" only when the data A is greater than the data B, the switching circuit 6 is closed in response to the output C being "1", the data in the conversion result register 3 is stored in the conversion result register 4, and the count value of the counter 15 is cleared. In this way, the conversion result register 4 can store a maximum value of data hitherto A/D-converted.

When the analog signal reaches maximum value at a particular point of time, and then becomes steady state at a less than the maximum value, the A/D conversion is executed by a number of counts preset in the counter 15 even when the output C of the comparator 5 does not become "1". When a signal 22 showing the count finish outputted by the counter 15 becomes "1", the switching circuit 6 is closed and the data in the conversion result register 3 is stored in the conversion result register 4. That is, even when A/D conversions are repeated predetermined times, when data A is equal to or less than data B, for example, the A/D-converted data is stored in the conversion result register 4 assuming that the analog signal is at a steady state. The same can also be operated when the value of the data A/D-converted predetermined times is not in a steady state but less than the maximum value after the maximum value is stored in the conversion result register 4.

A desired number of counts can be set in the counter 15. After the preset number of counts have been executed and the signal 22 becomes "1", the counter 15 resumes to count the preset number of counts. When the comparison finds that the data A is greater than the data B and the output C is "1", the output C functions as a clear signal for the counter 15. When a fresh analog signal has a greater value than that of the data in the conversion result register 4, the count value of the counter 15 is initialized, and the counter 15 continues to count.

The count value my be initialized either when the output C is "1" only when the result of the comparison finding that the data A is greater than the data B, or when the output C is "1" only when the result of comparison finding that the data A is less than the data B.

Even when the analog signal does not become a steady state; for example, after it continues to increase in value and reaches the maximum value, it decreases in value, the A/D-converted data is stored in the conversion result register 4 when the counter 15 counts a preset count value.

The counter 15 does not count the conversion finish signals 20, it counts clocks for a predetermined period of time, and when it counts a predetermined number of clocks, the data in the conversion result register 3 may be inputted to the conversion result register 4.

In such a way, when the analog signal increases or decreases in value, the larger value in either direction is detected, and when the direction of increase or decrease is inverted from one to another from a point of time or they become a steady state, the value of the analog signal can be identified after a predetermined time. In the conventional A/D converters, each time the A/D conversion is finished, it is required to read out the A/D-converted data and arithmetically process the degree of change between the present data and the previous data so as to identify the condition of the analog signal. Thereby the control of the apparatus is started. In this embodiment since the data in the conversion result register 4 is defined, the control of the apparatus can be immediately started.

When the output (22) of the counter 15 is used as an interrupt signal instead of being inputted to the OR circuit 14, the data in the conversion result register 4 is held, and a newest data A/D-converted can be recognized by reading out the data in the conversion result register 3.

Embodiment 9

Figure 12:
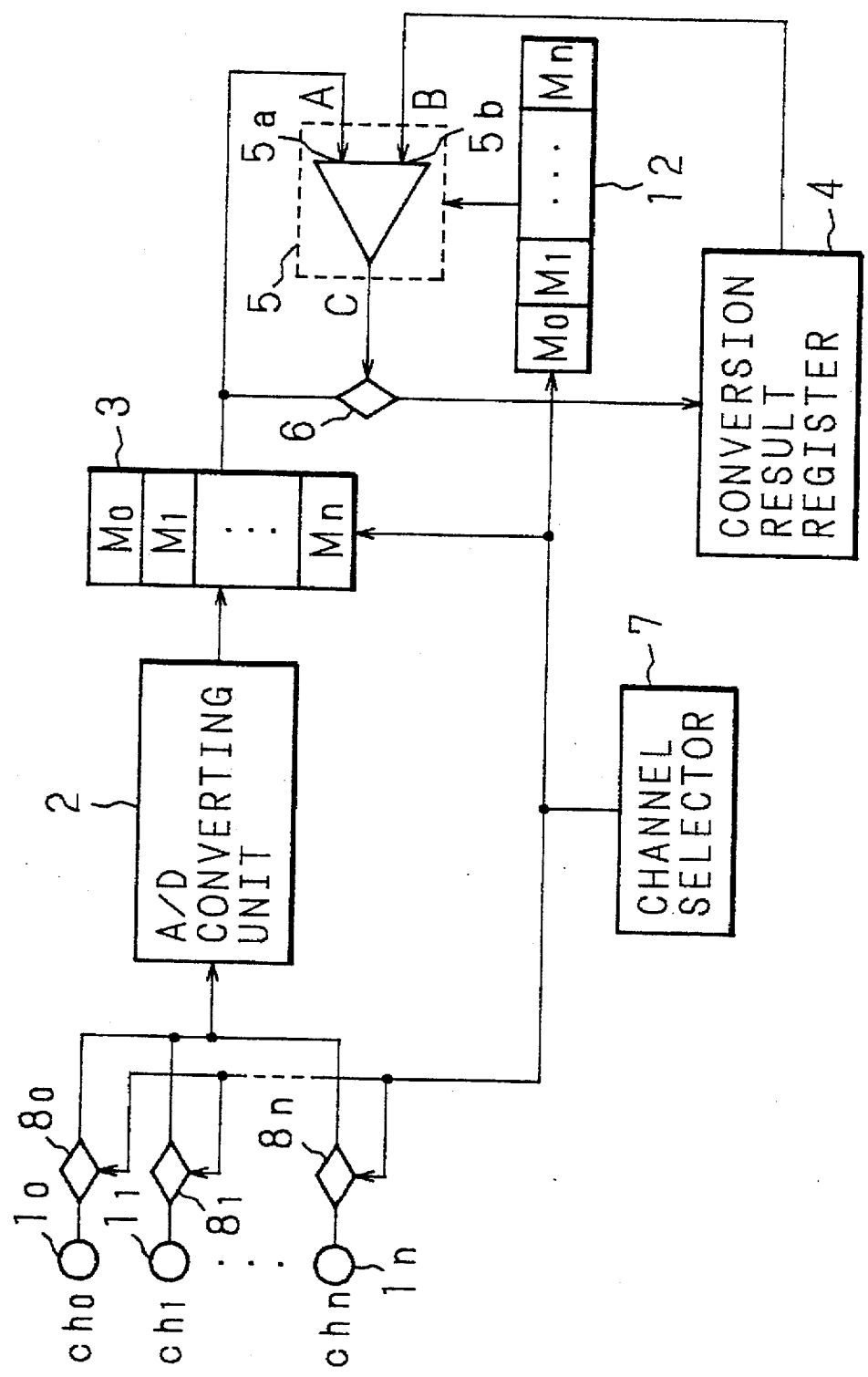
FIG. 12 is a block diagram showing a configuration of a ninth embodiment of an A/D converter of the present invention.

FIG. 12 is a block diagram showing a configuration of the ninth embodiment of the A/D converter related to the invention.

The A/D converter is provided with a plurality of analog input terminals $1_0, 1_1 \ldots 1_n$ to which analog signals are individually inputted. These analog signals are inputted to the A/D converting unit 2 through switching circuits $8_0, 8_1 \ldots 8_n$. The A/D-converted data A outputted from A/D converting unit 2 is inputted to the conversion result register 3 having memory areas $M_0, M_1 \ldots M_n$. The data A in the conversion result register 3 is inputted to one input terminal 5a of the comparator 5, and inputted to the conversion result register 4 through the switching circuit 6. The data in the conversion result register 4 is inputted to the other input terminal 5b of the comparator 5. The output C of the comparator 5 is given to the switching circuit 6 as a switching signal.

A channel selecting signal outputted from the channel selector 7 is given to the switching circuits $8_0, 8_1 \ldots 8_n$, the conversion result register 3 and the comparison switching register 12 which includes memory areas $M_0, M_1 \ldots M_n$ corresponding to the channels. The switching register 12 stores a data which switches the comparative operation of the comparator 5 corresponding to the analog input terminals $1_0, 1_1 \ldots 1_n$. The comparison operation of the case of comparing the data A and the data B with each other can be snitched between that the output C of the comparator 5 is "1" when the data A is larger than the data B, that the output C of the comparator 5 is "1" when the data A is smaller than the data B or that the comparison operation is not performed.

Next, explanation will be given on the operation of the A/D converter.

When a channel selecting signal for selecting the channel $ch_1$, for example, is outputted from the channel selector 7, the switching circuit $8_1$ is closed, and the memory area $M_1$ of the conversion result register 3 and the memory area $M_1$ of the comparison switching register 12 are selected. The data B in the conversion result register 4 is inputted to the input terminal 5b of the comparator 5. The analog signal inputted to the analog input terminal $1_1$ is A/D-converted by the A/D converting unit 2, and the A/D-converted data A is stored in the memory area $M_1$ of the conversion result register 3, and inputted to the input terminal 5a of the comparator 5.

In this situation, when the memory area $M_1$ of the comparison switching register 12 stores a data which makes the output C of the comparator 5 "1" when the data A is greater than the data B, the output C of the comparator 5 is "1" when the result of comparison finds that the data A is greater than the data B, thereby closing the switching circuit 6. The data in the memory area $M_1$ of the conversion result register 3 is stored in the conversion result register 4, so that the data in the conversion result register 4 is updated to a greater value. Conversely, when the memory area $M_1$ of the switching register 12 stores a data which makes the output C of the comparator 5 "1" when the data A is less than data B, the output C of the comparator 5 is "1" when the result of comparison finds that the data A is less than the data B, thereby closing the switching circuit 6. The data in the memory area $M_1$ of the conversion result register 3 is stored in the conversion result register 4, so that the data in the conversion result register 4 is updated to a less value. Or when the comparison switching register 12 stores a data which does not execute any comparative operation, the data in the conversion result register 12 is not be updated. The same procedure is applied to an analog signal of another channel.

Thereby, a channel can be selected for determining an analog signal having the maximum value or minimum value of the analog signals of a plurality of channels, and also a channel can be selected which does not compare data. The relationship between analog signals in the channels can be readily recognized due to the character of the analog signals.

Embodiment 10

Figure 13:
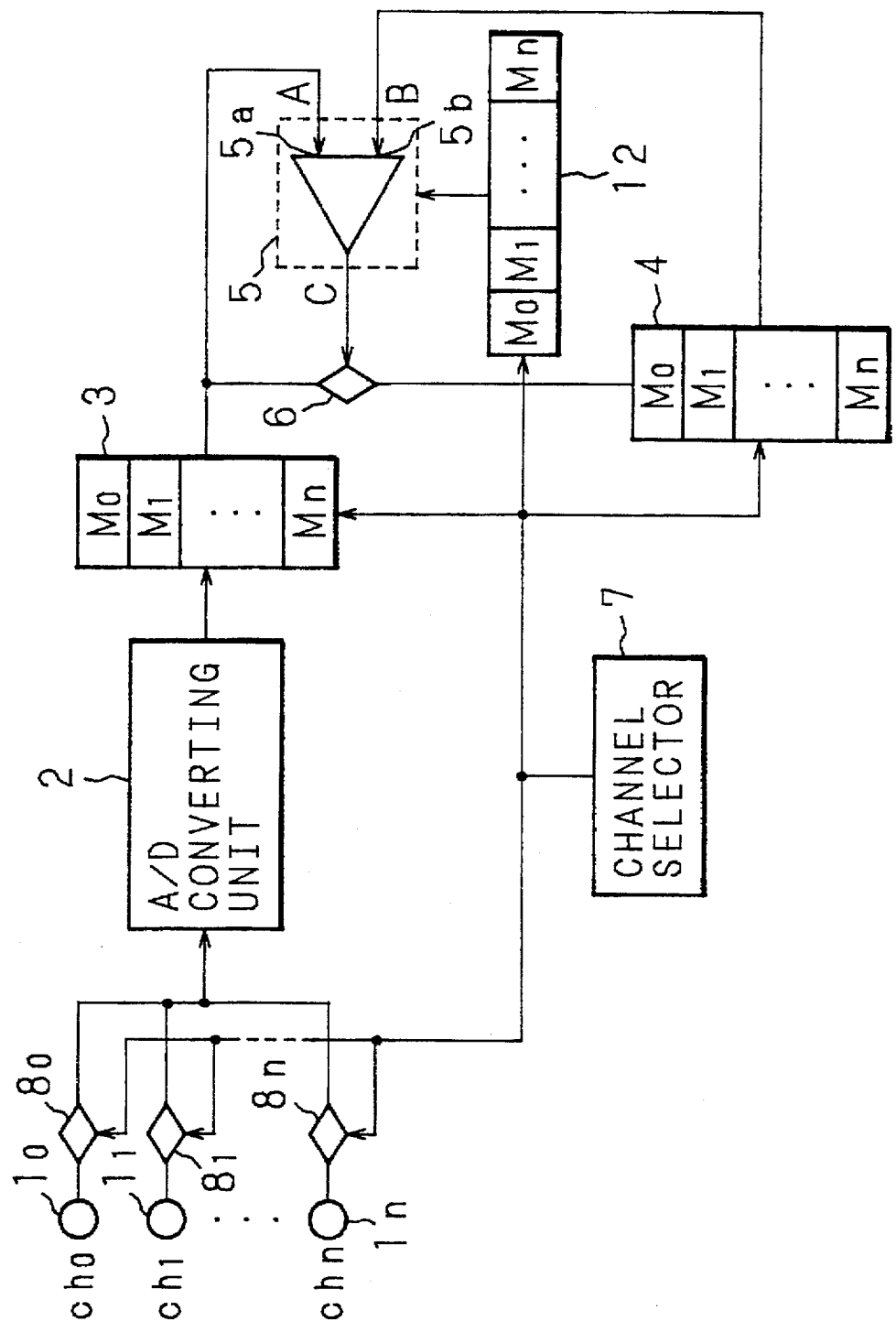
FIG. 13 is a block diagram showing a configuration of a tenth embodiment of an A/D converter of the present invention.

FIG. 13 is a block diagram showing a configuration of the tenth embodiment of the A/D converter related to the invention.

The conversion result register 4 includes the memory areas $M_0, M_1 \ldots M_n$ corresponding to the channels $ch_0, ch_1 \ldots ch_n$. The other configuration is same as that of the A/D converter shown in FIG. 12, and the same components have the same reference symbols.

Next, explanation will be made on the operation of the A/D converter. This A/D converter is operated in the same way as the one shown in FIG. 12, except the memory operation in the conversion result register 4. When the output C of the comparator 5 is "1", the data in the memory area of the conversion result register 3 is stored in that memory area of the conversion result register 4 which corresponds to the memory area of the conversion result register 3. In this way, the maximum value data or the minimum value data obtained by A/D converting can be stored for each channel. The switching operation between the maximum value data and the minimum value data for each channel can be performed on the basis of the data in each of the memory areas $M_0, M_1 \ldots M_n$ of the comparison switching register 12. The data can be set by a hardware or a software. Embodiment 10 is particularly advantageous when the changes of the analog signal is examined channel by channel.

Embodiment 11

Figure 14:
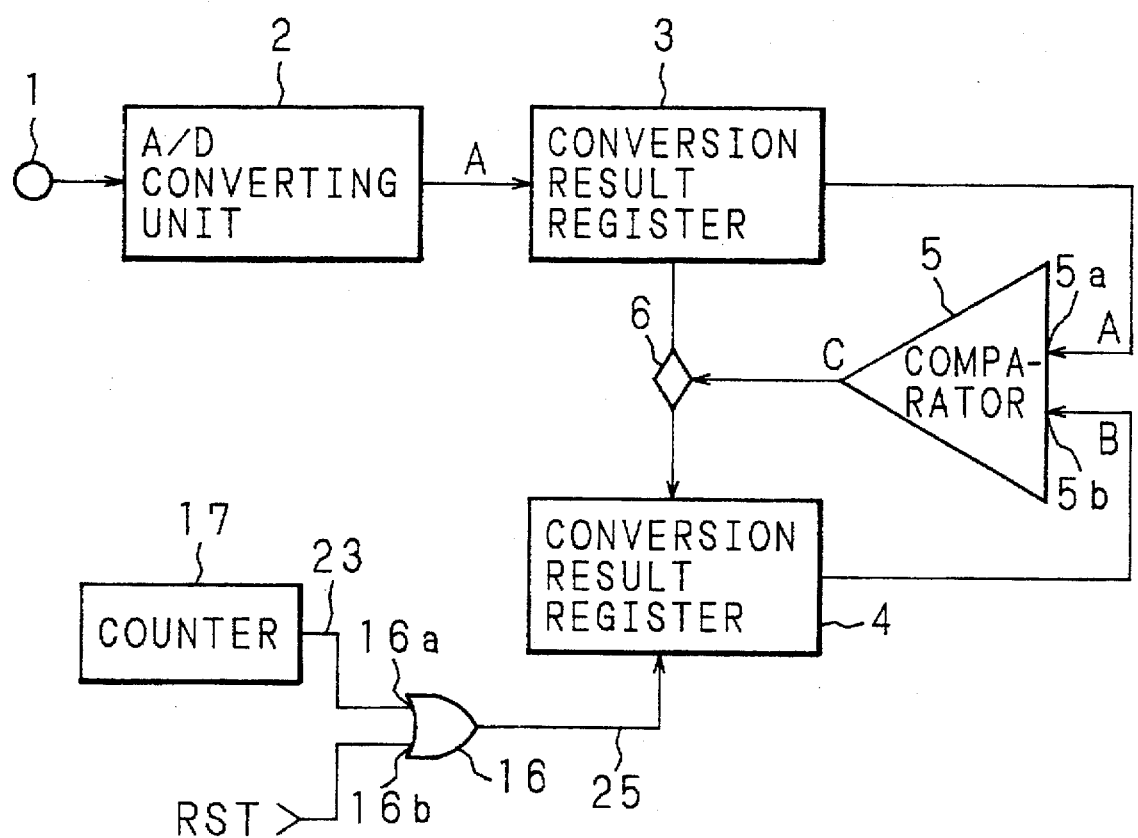
FIG. 14 is a block diagram showing a configuration of an eleventh embodiment of an A/D converter of the present invention.

FIG. 14 is a block diagram showing a configuration of an eleventh embodiment of the A/D converter related to the invention. An analog signal inputted to the analog input terminal 1 is inputted to the A/D conversion unit 2, and the A/D-converted data is inputted to the conversion result register 3. The data in the conversion result register 3 is inputted to one input terminal 5a of the comparator 5, and inputted to the conversion result register 4 through the switching circuit 6. The data in the conversion result register 4 is inputted to the other input terminal 5b of the comparator 5. An output 23 of the counter 17 is inputted to one input terminal 16a of the OR circuit 16. A reset signal RST from outside, for example, is inputted to the other input terminal 16b of the same. The output 25 of the OR circuit 16 is given to the conversion result register 4.

Next, explanation will be made on the operation of the A/D converter.

The analog signal inputted to the analog input terminal 1 is A/D-converted in the A/D converting unit 2 and is stored in the conversion result register 3. The comparator 5 compares between the data A of the conversion result register 3 and the data B of the conversion result register 4, and when the data A is greater than the data B, the output C of the comparator 5 is "1", thereby closing the switching circuit 6. Thus the data in the conversion result register 3 is stored in the conversion result register 4.

In this way, the conversion result register 4 can store the maximum value data of those hitherto obtained from the A/D conversion.

Moreover this A/D converter is configured so that the data in the conversion result register 4 can be cleared so as to know from which time point the maximum value data stored in the conversion result register 4 has been A/D-converted. When the counter 17 counts the pre-set number of counts, the output 23 thereof becomes "1", and the output 25 of the OR circuit 16 becomes "1", thereby clearing the data of the conversion result register 4.

In this way, when the counter 17 is provided the data in the conversion result register 4 can be cleared at predetermined intervals of time, thereby the conversion result register 4 stores a maximum value for a pre-set period of time. It is optional that the predetermined value set in the counter 17 can be adjustable or fixed. When the reset signal RST is used, it is inputted from the outside so as to clear the data in the conversion result register 4, thereby the maximum value data among the data A/D-converted from the time point is stored in the conversion result register 4. Even when the reset signal RST can be generated by software, the maximum value of the data being resultant of the A/D conversion from the time point of the generation can be recognized.

As described above, by changing the comparative operation, the minimum value data can be also stored in the conversion result register 4.

In this way, it can be readily recognized that from which time point a maximum value data or minimum value data is stored in the conversion result register 4. And the delicate control of the apparatus can be effected in response to the current analog signal. Such a function of Embodiment 11 can be applied to the embodiments described above.

According to the present invention, the A/D converter comprises a first register (3) for storing data obtained by A/D converting an analog signal; a second register (4) for receiving the data of the first register through a switching means; and a comparator for comparing the data in the first and second registers. Since it is constructed so that the data of the first register is stored in the second register in relation to the result of comparison conducted by the comparator, the second register can store a maximum value or a minimum value data of the A/D-converted data, which is defined. Therefore, when the operation of the apparatus is controlled in relation to an analog signal, the control of the apparatus can be executed on the basis of the data in the second register in a short time. In addition, it is not necessary to perform by a CPU the data processing for obtaining a maximum value or a minimum value of the A/D-converted data, thereby diminishing the load of the CPU.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An analog/digital converter (A/D converter) comprising:

an A/D converting unit configured to convert an analog signal and provide a digital output;

a first register for storing the digital output from the A/D converting unit;

a second register for receiving the data in said first register a comparator for comparing the data in said first register and the data in said second register with each other and providing an output signal corresponding to a result of comparing; and a first switch connected between the first register and the second register and receiving the output signal from the comparator, wherein said first switch is responsive to the output signal from the comparator to open or close on the basis of the result of comparing by said comparator.

2. The A/D converter according to claim 1, further comprising:

a plurality of channels each configured to convey an analog signal;

a plurality of second switches each provided in a respective one of the plurality of channels so as to input one of analog signals conveyed in each of the channels to said A/D converting unit; and a selector for outputting a selecting signal corresponding to a selected channel to said plurality of second switches and said first register, wherein said first register has a plurality of memory areas corresponding to the plurality of channels, and said second register stores a maximum value data or a minimum vale data among the A/D-converted data of all channels.

3. The A/D converter according to claim 2, wherein said second register has a plurality of memory areas corresponding to the plurality of channels and receives said the selecting signal, and a maximum or minimum value data given to a selected memory area of said first register is stored in a selected memory area of said second register.

4. The A/D converter according to claim 3, wherein said A/D converting unit outputs a conversion finish signal when the A/D conversion is finished, and said A/D conversion finish signal is outputted to the outside when the data in the first register is inputted to the second register upon closure of the first switch in response to a signal outputted from said comparator.

5. The A/D converter according to claim 3, further comprising a third register having a plurality of memory areas corresponding to the plurality of channels and storing the data for switching a comparison operation of said comparator in each of the plurality of memory areas from a first type of comparison of the data in said first register and data in said second register to a second type of comparison of the data in said first register and data in said second register, wherein said third register receives said selecting signal.

6. The A/D converter according to claim 5, further comprising a means for resetting said second register.

7. The A/D converter according to claim 3, further comprising a means for resetting said second register.

8. The A/D converter according to claim 2, further comprising:

a third switch for being opened or closed ont he basis of the output of said comparator; and a third register for receiving said selecting signal through said third switch and storing it therein.

9. The A/D converter according to claim 8, wherein said A/D converting unit outputs a conversion finish signal when the A/D conversion is finished, and said A/D conversion finish signal is outputted to the outside when the data in the first register is inputted to the second register upon closure of the first switch in response to a signal outputted from said comparator.

10. The A/D converter according to claim 8, further comprising a means for resetting said second register.

11. The A/D converter according to claim 2, wherein said A/D converting unit outputs a conversion finish signal when said A/D conversion is finished, and said A/D conversion finish signal is outputted to the outside when the data of the first register is inputted to the second register upon closure of the first switch in response to a signal outputted from said comparator.

12. The A/D converter according to claim 11, further comprising a means for resetting said second register.

13. The A/D converter according to claim 2, further comprising a third register having a plurality of memory areas corresponding to the plurality of channels and storing the data for switching a comparative operation of said comparator in each of the plurality of memory areas, a comparison operation of said comparator in each of the plurality of memory areas from a first type of comparison of the data in said first register and data in said second register to a second type of comparison of the data in said first register and data in said second register, wherein said third register receives said selecting signal.

14. The A/D converter according to claim 13, further comprising a means for resetting said second register.

15. The A/D converter according to claim 2, further comprising a means for resetting said second register.

16. The A/D converter according to claim 1, further comprising:

a plurality of channels each configured to convey an analog signal;

a plurality of second switches each provided in a respective one of the plurality of channels channels so as to input one of analog signals conveyed in each plurality of channels of the to said A/D converting unit;

a third switch for being opened or closed on the basis of the output of said comparator;

a selector for outputting a selecting signal corresponding to a selected channel to said plurality of second switches and said third switch; and a third register for receiving said selecting signal through said third switch and storing it therein, wherein said second register stores a maximum or minimum value data among of the A/D-converted data of all channels, and said third register stores a selecting signal which is a channel data corresponding to the data stored in said second register.

17. The A/D converter according to claim 16, wherein said A/D converting unit outputs a conversion finish signal when the A/D conversion is finished, and said A/D conversion finish signal is outputted to the outside when the data in the first register is inputted to the second register upon closure of the first switch in response to a signal outputted from said comparator.

18. The A/D converter according to claim 16, further comprising a means for resetting said second register.

19. The A/D converter according to claim 1, wherein said A/D converting unit outputs a conversion finish signal when the A/D conversion is finished, and said A/D conversion finish signal is outputted to the outside when the data of the first register is inputted to the second register upon closure of the first switch in response to a signal outputted from said comparator.

20. The A/D converter according to claim 1, further comprising a counter for counting the A/D conversion finish signals outputted from the A/D converting unit every time the A/D conversion is finished, wherein said first switch is closed when said counter counts a predetermined number of counts or when the output of said comparator is active.

21. The A/D converter according to claim 20, further comprising a means for resetting said second register.

22. The A/D converter according to claim 1, further comprising a means for resetting said second register.

23. An analog/digital converter (A/D converter) comprising:

an A/D converting unit configured to convert an analog signal and provide a digital output;

a first register for storing the digital output from the A/D converting unit;

a second register for receiving the data in said first register;

a third register for storing a reference data with which the data in said first register is compared;

a comparator for comparing the data in said first register and a the reference data in said third register and providing an output signal corresponding to a result of comparing; and a first switch connected between the first register and the second register and receiving the output signal from the comparator, wherein said first switch is responsive to the output signal from the comparator to open or close on the basis of the result of comparing by said comparator.

24. An analog/digital converter (A/D converter) comprising:

an A/D converting unit configured to convert an analog signal and provide a digital output;

a first register for storing the digital output from the A/D converting unit;

a second register for receiving the data in said first register;

a comparator for comparing the data in said first register and a predetermined data and providing an output signal corresponding to a result of comparing;

a first switch connected between the first register and the second register and receiving the output signal from the comparator; and a third register connected to said comparator for storing data which switches a comparing operation of said comparator from a first type of comparison of the data in said first register and the predetermined data to a second type of comparison of the data in said first register and the predetermined data, wherein said first switch is responsive to the output signal from the comparator to open or close on the basis of the result of comparing by said comparator.

* * * * *